(12) United States Patent
Lin et al.

(10) Patent No.: US 9,985,893 B2
(45) Date of Patent: May 29, 2018

(54) LOAD SHARING METHOD AND APPARATUS, AND BOARD

(71) Applicant: HUAWEI TECHNOLOGIES CO., LTD., Shenzhen, Guangdong (CN)

(72) Inventors: Liankui Lin, Shenzhen (CN); Fan Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 14/571,711

(22) Filed: Dec. 16, 2014

(65) Prior Publication Data

US 2015/0103641 A1    Apr. 16, 2015

Related U.S. Application Data

(63) Continuation of application No. PCT/CN2012/077326, filed on Jun. 21, 2012.

(51) Int. Cl.
*H04L 12/803* (2013.01)
*H04L 12/26* (2006.01)
*H04L 12/24* (2006.01)

(52) U.S. Cl.
CPC ........ *H04L 47/125* (2013.01); *H04L 41/0654* (2013.01); *H04L 43/16* (2013.01)

(58) Field of Classification Search
CPC ............. H04L 67/1002; H04L 67/1004; H04L 67/1029; H04L 67/101; H04L 67/1027;

(Continued)

(56) References Cited

U.S. PATENT DOCUMENTS 6,473,424 B1    10/2002  DeJager et al.
7,486,954 B2    2/2009   Lee et al.
(Continued)

FOREIGN PATENT DOCUMENTS

CN    1482769     3/2004
CN    1859276     11/2006
(Continued)

OTHER PUBLICATIONS

Partial Supplementary European Search Report dated May 12, 2015 in corresponding European Patent Application No. 12879493.0.
(Continued)

*Primary Examiner* — Yemane Mesfin
*Assistant Examiner* — Peter Chen
(74) *Attorney, Agent, or Firm* — Staas & Halsey LLP

(57) ABSTRACT

Embodiments of the present invention provide a load sharing method and apparatus, and a board. The method includes: receiving, by a built-in forwarding unit, to-be-transmitted data; obtaining, by a management control unit, current load ratios of forwarding units; and if it is determined that a current load ratio of any forwarding unit of the forwarding units is less than a preset load ratio threshold, determining that the forwarding unit is a unit for forwarding the to-be-transmitted data, where the built-in forwarding unit and the management control unit are located in a same board, and the forwarding units include the built-in forwarding unit and another forwarding unit outside the board. The present invention can solve a problem of low data transmission reliability in an existing load sharing method.

14 Claims, 4 Drawing Sheets

(58) Field of Classification Search
CPC ............... H04L 67/1034; H04L 69/40; H04L 29/08252; H04L 45/00; H04L 47/125
See application file for complete search history.

(56) References Cited

U.S. PATENT DOCUMENTS

| | | | | |
|---|---|---|---|---|
| 8,189,476 | B1* | 5/2012 | Rothstein | H04L 47/125 370/235 |
| 2005/0210144 | A1* | 9/2005 | Kumagai | H04L 67/1002 709/229 |
| 2006/0029097 | A1* | 2/2006 | McGee | H04L 47/10 370/468 |
| 2010/0260181 | A1* | 10/2010 | Chang | H04L 69/32 370/390 |

FOREIGN PATENT DOCUMENTS

| | | |
|---|---|---|
| CN | 101184114 | 5/2008 |
| CN | 101815033 | 8/2010 |
| CN | 102098224 | 6/2011 |
| CN | 102137018 | 7/2011 |
| EP | 2 180 644 A1 | 4/2010 |
| EP | 2 670 094 A1 | 12/2013 |
| WO | 00/30322 | 5/2000 |

OTHER PUBLICATIONS

Chinese Office Action dated Jul. 3, 2014 in corresponding Chinese Patent Application No. 201280000579.0.

PCT International Search Report dated Mar. 28, 2013 in corresponding International Patent Application No. PCT/CN2012/077326.

International Search Report dated Mar. 28, 2013, in corresponding International Patent Application No. PCT/CN2012/077326.

* cited by examiner

LOAD SHARING METHOD AND APPARATUS, AND BOARD

CROSS-REFERENCE TO RELATED APPLICATIONS

This application is a continuation of International Application No. PCT/CN2012/077326, filed on Jun. 21, 2012, which is hereby incorporated by reference in its entirety.

TECHNICAL FIELD

The present invention relates to communications technologies, and in particular, to a load sharing method and apparatus, and a board.

BACKGROUND

Currently, in a system in the communications field, in order to improve system reliability and improve a service processing capability, an existing load sharing device generally has an active/standby mode and a load sharing mode. In the active/standby mode, only one active unit (including a management control unit and a forwarding unit) works in a load sharing apparatus, and remaining one or more standby units (including a management control unit and a forwarding unit) perform hot backup or cold backup. When a fault occurs on the active unit, the standby unit can perform switching within a short period of time, to ensure a normal service. In the load sharing mode, multiple management control units and forwarding units can work together and undertake service processing together. In this case, no idle resource exists, so that utilization of bandwidth resources of the system is maximized.

An existing load sharing apparatus mainly has the following two manners:

1. A management control unit and a forwarding unit do not share a board, that is, the management control unit and the forwarding unit are physically separated.

2. A management control unit and a forwarding unit share a board and are located on a same board, and multiple identical boards implement a distributed load sharing function.

During implementation of the present invention, the inventors find that an existing load sharing method has a problem of low data transmission reliability.

SUMMARY

Embodiments of the present invention provide a load sharing method and apparatus, and a board, which can improve reliability of data transmission.

According to a first aspect, an embodiment of the present invention provides a load sharing method, including:

receiving, by a built-in forwarding unit, to-be-transmitted data;

obtaining, by a management control unit, current load ratios of forwarding units; and if it is determined that a current load ratio of any forwarding unit of the forwarding units is less than a preset load ratio threshold, determining that the forwarding unit is a unit for forwarding the to-be-transmitted data, where the built-in forwarding unit and the management control unit are located in a same board, and the forwarding units include the built-in forwarding unit and another forwarding unit outside the board.

In a first possible implementation manner, before the receiving, by a built-in forwarding unit, to-be-transmitted data, specific implementation may be:

presetting, by the management control unit, load ratio thresholds of the forwarding units according to maximum transmission capacities of the forwarding units.

In a second possible implementation manner, before the receiving, by a built-in forwarding unit, to-be-transmitted data, specific implementation may be:

receiving, by the management control unit, the current load ratios sent by the forwarding units in real time, and updating, according to the current load ratios sent by the forwarding units in real time, current load ratios corresponding to the forwarding units in a load information list in real time.

According to the second possible implementation manner, in a third possible implementation manner, specific implementation of the obtaining, by a management control unit, current load ratios of forwarding units may be:

querying the load information list, to obtain the current load ratios of the forwarding units.

In a fourth possible implementation manner, after the receiving, by a built-in forwarding unit, to-be-transmitted data and before the obtaining, by a management control unit, current load ratios of forwarding units, specific implementation may be:

separately sending, by the management control unit, request messages for querying for the current load ratios of the forwarding units to corresponding forwarding units, so that the forwarding units obtain respective corresponding current load ratios; and separately receiving response messages sent by the forwarding units, where the response messages include the current load ratios corresponding to the forwarding units.

According to a second aspect, an embodiment of the present invention provides a board, including a built-in forwarding unit and a management control unit that are built in the board, where the built-in forwarding unit is configured to receive to-be-transmitted data; and the management control unit specifically includes:

an obtaining module, configured to obtain current load ratios of forwarding units, where the forwarding units include the built-in forwarding unit and another forwarding unit outside the board; and a determining module, configured to: if it is determined that a current load ratio of any forwarding unit of the forwarding units is less than a preset load ratio threshold, determine that the forwarding unit is a unit for forwarding the to-be-transmitted data.

According to a third aspect, an embodiment of the present invention provides a load sharing apparatus, including: a first board and another forwarding unit outside the first board, where the another forwarding unit is connected to the first board;

the first board is the foregoing board; and the another forwarding unit is configured to receive to-be-transmitted data that is sent by a forwarding unit built in the first board, and forward the to-be-transmitted data.

According to a fourth aspect, an embodiment of the present invention provides a load sharing method, including:

receiving, by a first built-in forwarding unit, to-be-transmitted data;

obtaining, by a second management control unit in an active state, current load ratios of forwarding units; and determining, by the second management control unit, whether a current load ratio of any forwarding unit of the forwarding units is less than a preset load ratio threshold, and if yes, determining that the forwarding unit is a unit for forwarding the to-be-transmitted data, where the first built-in forwarding unit and a first management control unit in a standby state are located in a first board, the second management control unit in the active state and at least one second built-in forwarding unit are located in a second board; and the forwarding units include the first and the second built-in forwarding units and another forwarding unit located in a board other than the first and the second boards.

According to a fifth aspect, an embodiment of the present invention provides a load sharing apparatus, including:

a standby board, an active board, and another forwarding unit outside the standby board and the active board, where the another forwarding unit is separately connected to the standby board and the active board, and the standby board is connected to the active board;

a first built-in forwarding unit in the standby board is configured to receive to-be-transmitted data, and a first management control unit in the standby board is in a standby state;

a second management control unit in the active board is in an active state, and is configured to obtain current load ratios of forwarding units, and if it is determined that a current load ratio of any forwarding unit of the forwarding units is less than a preset load ratio threshold, determine that the forwarding unit is a unit for forwarding the to-be-transmitted data; and the another forwarding unit is configured to receive the to-be-transmitted data sent by the first built-in forwarding unit, and forward the to-be-transmitted data.

It can be known from the foregoing technical solutions that a board in the embodiments of the present invention determines, according to obtained current load ratios of forwarding units and load ratio thresholds of the forwarding units, a forwarding unit for sending to-be-transmitted data, which can improve data transmission reliability and solves a problem of low data transmission reliability because in an existing load sharing apparatus, a management control unit and a forwarding unit do not share a board and a great number of boards are needed. In addition, in the embodiments, another forwarding unit outside the board can be used to share load with a forwarding unit built in the board, which can reduce complexity of software scheduling and reduce costs.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figure 1:
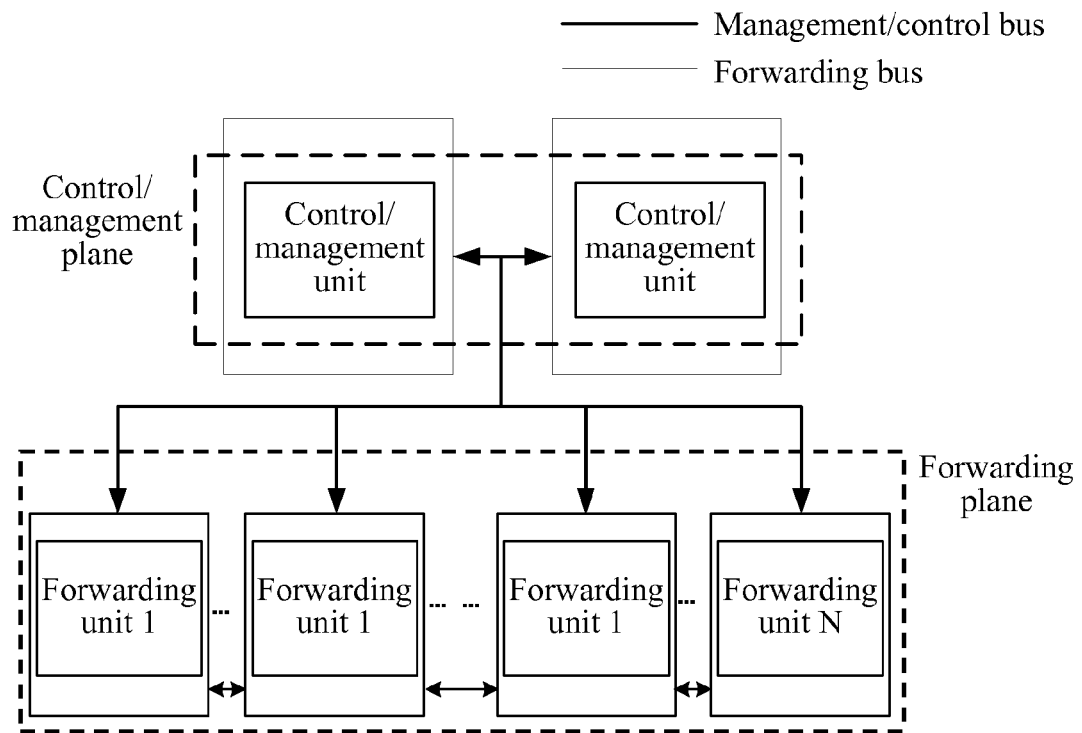
FIG. 1 is a schematic structural diagram of a load sharing apparatus in the prior art.

FIG. 1 is a schematic structural diagram of a load sharing apparatus in the prior art. As shown in FIG. 1, the load sharing apparatus includes multiple management control units and multiple forwarding units, where each management control unit is a board, the forwarding units are boards separated from the management control units, and each forwarding unit is a board.

Because the management control units and the forwarding units do not share a board, in order to implement distributed load sharing, a great number of boards are needed. Therefore, problems of great difficulty in networking and in software implementation exist, which results in low data transmission reliability.

Figure 2:
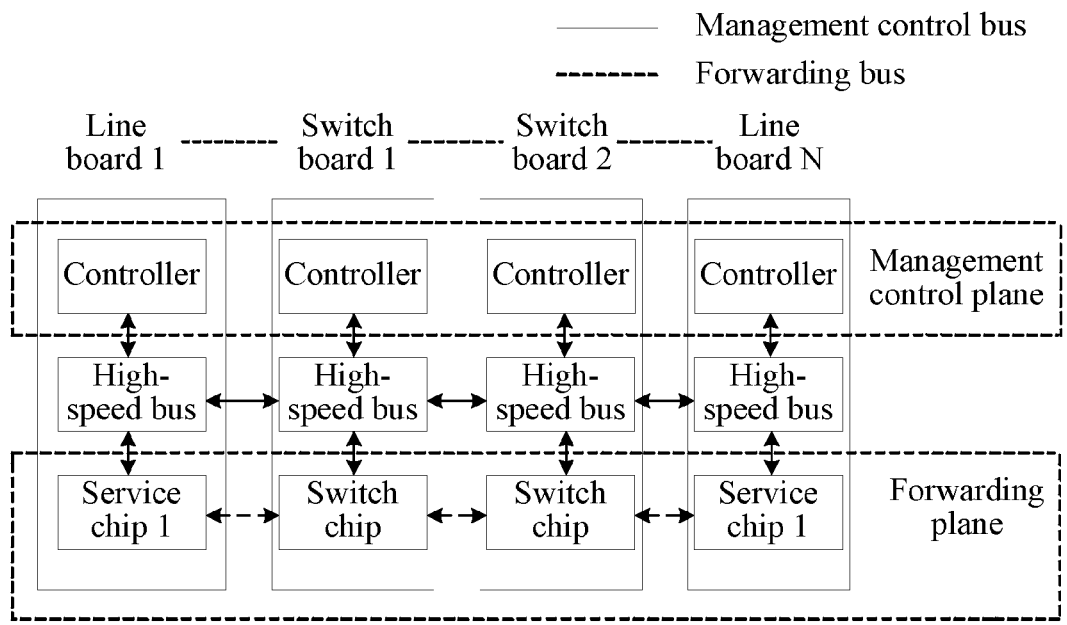
FIG. 2 is a schematic structural diagram of another load sharing apparatus in the prior art.

FIG. 2 is a schematic structural diagram of another load sharing apparatus in the prior art. As shown in FIG. 2, the load sharing apparatus includes multiple management control units and multiple forwarding units, where the management control units and the forwarding units all share boards, and each board has a management control unit and a forwarding unit thereon.

As shown in FIG. 2, a management control unit in each board can manage and control only a forwarding unit on the board. If data received by the forwarding unit on the board is large, and load needs to be shared with a forwarding unit on another board, the management control unit on the board needs to perform software coordination with a management control unit on the another board and cannot directly control and manage the forwarding unit on the another board. Because each board includes a management control unit and a forwarding unit, there is a great number of management control units, and software coordination between the multiple management control units is very complex. In addition, because each board includes a management control unit and a forwarding unit, there exists a problem of high hardware costs.

To solve the foregoing problems in the prior art, the present invention provides a load sharing method, which can solve a problem of low data transmission reliability in an existing load sharing method.

Figure 3:
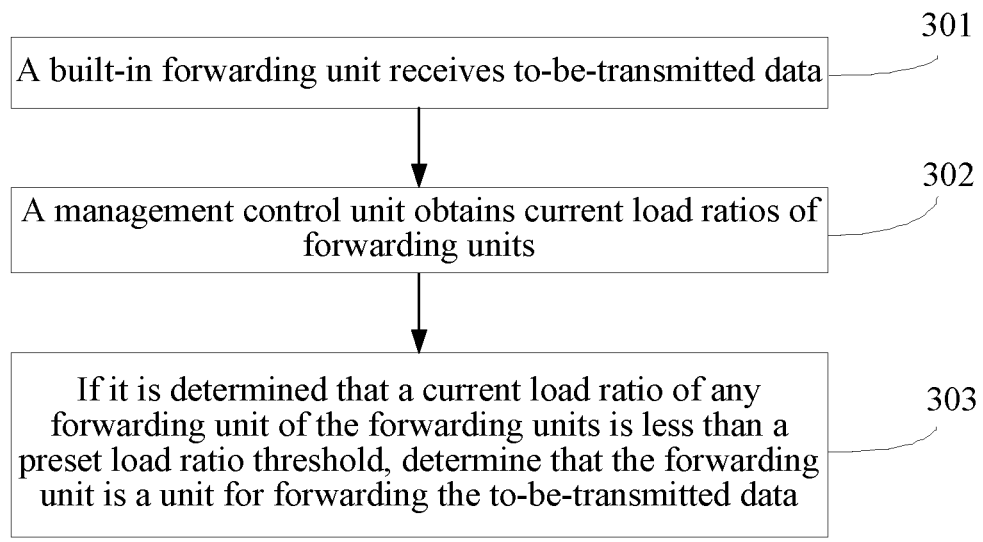
FIG. 3 is a schematic flowchart of a load sharing method according to Embodiment 1 of the present invention.

FIG. 3 is a schematic flowchart of a load sharing method according to Embodiment 1 of the present invention. As shown in FIG. 3, the method includes:

Step 301: A built-in forwarding unit receives to-be-transmitted data.

The to-be-transmitted data is data sent by any network entity to another network entity by using a board. In an actual application, a built-in forwarding unit built in a board receives to-be-transmitted data.

Step 302: A management control unit obtains current load ratios of forwarding units.

In an optional implementation manner of the embodiment of the present invention, before the to-be-transmitted data is received, the management control unit built in the board may receive the current load ratios sent by the forwarding units in real time, and update, according to the current load ratios sent by the forwarding units in real time, current load ratios corresponding to the forwarding units in a load information list in real time. Correspondingly, the management control unit may query the load information list, to obtain the current load ratios of the forwarding units in real time.

In another optional implementation manner of the embodiment of the present invention, the management control unit may separately send request messages for querying for the current load ratios of the forwarding units to corresponding forwarding units; the forwarding units separately obtain respective corresponding current load ratios according to the received request messages; the forwarding units separately send response messages to the management control unit, where the response messages include the current load ratios corresponding to the forwarding units; and the management control unit separately receive the response messages sent by the forwarding units, and separately obtain the current load ratios of the forwarding units according to the response messages.

Step 303: If it is determined that a current load ratio of any forwarding unit of the forwarding units is less than a preset load ratio threshold, determine that the forwarding unit is a unit for forwarding the to-be-transmitted data.

In an optional implementation manner of the embodiment of the present invention, before the to-be-transmitted data is received, the management control unit may preset load ratio thresholds of the forwarding units according to maximum transmission capacities of the forwarding units.

In order to improve reliability of data transmission, in an optional implementation manner of the embodiment of the present invention, when one forwarding unit is sufficient for data transmission, the built-in forwarding unit may be preferentially used for data transmission, that is, if it is determined that a current load ratio of the built-in forwarding unit is less than the preset load ratio threshold, it is preferentially determined that the built-in forwarding unit is a unit for forwarding the to-be-transmitted data.

In an optional implementation manner of the embodiment of the present invention, when one forwarding unit is insufficient for data transmission, in order to improve reliability of data transmission, in the embodiment of the present invention, the to-be-transmitted data is forwarded by using another forwarding unit outside the board, that is, if it is determined that a current load ratio of any forwarding unit of the forwarding units is less than the preset load ratio threshold, it is determined that the forwarding unit is a unit for forwarding the to-be-transmitted data, where the any forwarding unit of the forwarding units includes the another forwarding unit outside the board.

It should be noted that the built-in forwarding unit and the management control unit are located in a same board, and the forwarding units include the built-in forwarding unit and another forwarding unit outside the board, where the number of forwarding units outside the board outside the board may be specifically determined according to a capacity of the to-be-transmitted data, which can not only reduce costs of capacity expansion, but also simplify a software control algorithm.

In this embodiment, if a board determines, according to obtained current load ratios of forwarding units and load ratio thresholds of the forwarding units, that a current load ratio of any forwarding unit of the forwarding units is less than a preset load ratio threshold, the board determines that the forwarding unit is a unit for forwarding to-be-transmitted data. In this way, a forwarding unit for data transmission can be adjusted dynamically according to the current load ratios of the forwarding units, thereby solving a problem of low data transmission reliability because in an existing load sharing apparatus, a management control unit and a forwarding unit do not share a board and a great number of boards are needed, and further improving the reliability of data transmission. In addition, in this embodiment, another forwarding unit outside the board can be used to share load with a forwarding unit built in the board, which reduces complexity of software scheduling and reduces costs.

Figure 4:
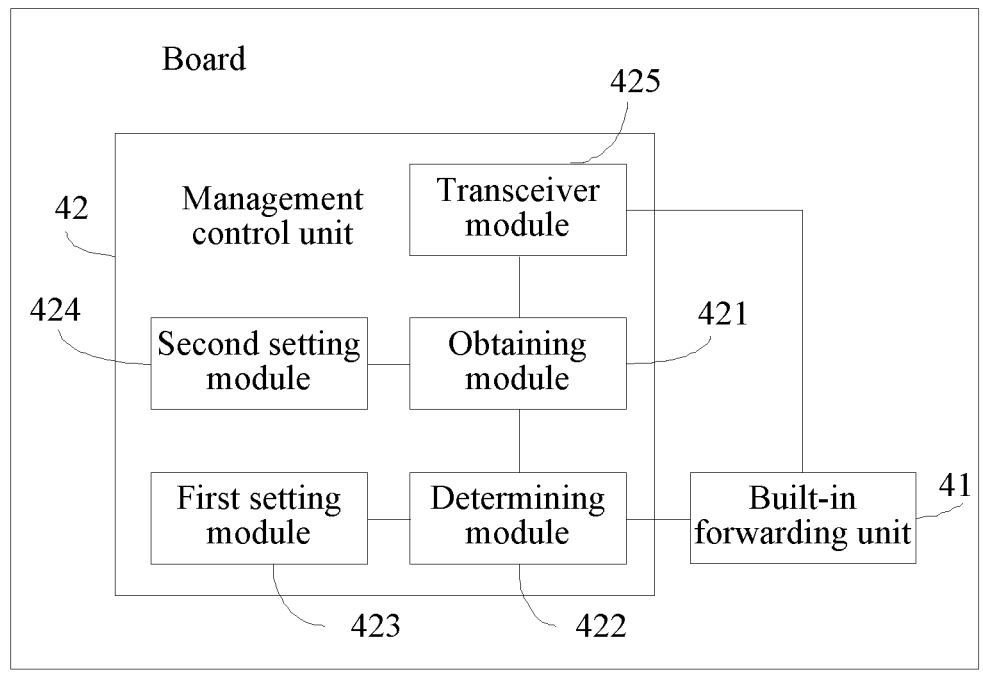
FIG. 4 is a schematic structural diagram of a board according to Embodiment 2 of the present invention.

FIG. 4 is a schematic structural diagram of a board according to Embodiment 2 of the present invention. As shown in FIG. 4, the board specifically includes a built-in forwarding unit 41 and a management control unit 42 that are built in the board.

For example, the built-in forwarding unit 41 may be connected to the management control unit 42 by using a management control bus, where the built-in forwarding unit 41 is configured to receive to-be-transmitted data.

In an optional implementation manner of the embodiment of the present invention, the management control unit 42 specifically includes:

an obtaining module 421, configured to obtain current load ratios of forwarding units; and a determining module 422, configured to: if it is determined that a current load ratio of any forwarding unit of the forwarding units is less than a preset load ratio threshold, determine that the forwarding unit is a unit for forwarding the to-be-transmitted data.

In an optional implementation manner of the embodiment of the present invention, the management control unit 42 specifically further includes:

a first setting module 423, configured to preset load ratio thresholds of the forwarding units according to maximum transmission capacities of the forwarding units.

In an optional implementation manner of the embodiment of the present invention, the management control unit 42 specifically further includes:

a second setting module 424, configured to receive the current load ratios sent by the forwarding units in real time, and update, according to the current load ratios sent by the forwarding units in real time, current load ratios corresponding to the forwarding units in a load information list in real time.

Correspondingly, the obtaining module 421 is specifically configured to query the load information list in the second setting module 424, to obtain the current load ratios of the forwarding units.

In an optional implementation manner of the embodiment of the present invention, the management control unit 42 specifically further includes:

a transceiver module 425, configured to separately send request messages for querying for the current load ratios of the forwarding units to corresponding forwarding units, so that the forwarding units obtain respective corresponding current load ratios; and separately receive response messages sent by the forwarding units, where the response messages include the current load ratios corresponding to the forwarding units; and the transceiver module 425 is further configured to send the current load ratios of the forwarding units to the obtaining module 421.

It should be noted that the forwarding units may specifically include the built-in forwarding unit 41 and another forwarding unit outside the board.

In an optional implementation manner of the embodiment of the present invention, when one forwarding unit is sufficient for data transmission, in order to improve reliability of data transmission, the built-in forwarding unit 41 may be preferentially used for data transmission. In specific implementation, the transceiver module 425 sends a current load ratio of the built-in forwarding unit 41 to the obtaining module 421, or the obtaining module 421 obtains a current load ratio of the built-in forwarding unit 41 from the second setting module 424; and if the determining module 42 determines, according to the current load ratio of the built-in forwarding unit 41 obtained by the obtaining module 421 and a load ratio threshold, set in the first setting module 423, of the built-in forwarding unit 41, that the current load ratio of the built-in forwarding unit 41 is less than the preset load ratio threshold, the determining module 42 preferentially determines that the built-in forwarding unit 41 is a unit for forwarding the to-be-transmitted data.

In another optional implementation manner of the embodiment of the present invention, when one forwarding unit is insufficient for data transmission, in order to improve reliability of data transmission, in the embodiment of the present invention, the to-be-transmitted data is forwarded by using another forwarding unit outside the board. In specific implementation, the transceiver module 425 sends current load ratios of forwarding units to the obtaining module 421, or the obtaining module 421 obtains current load ratios of forwarding units from the second setting module 424; and if the determining module 42 determines, according to the current load ratios of the forwarding units obtained by the obtaining module 421 and load ratio thresholds, set in the first setting module 423, of the forwarding units, that a current load ratio of any forwarding unit of the forwarding units is less than the preset load ratio threshold, the determining module 42 determines that the forwarding unit is a unit for forwarding the to-be-transmitted data. It should be noted that the forwarding units may specifically include the built-in forwarding unit 41 and the another forwarding unit outside the board.

It should be noted that a connection relationship between the another forwarding unit and the board is specifically that the another forwarding unit is connected to the built-in forwarding unit 41 by using a forwarding bus, and the another forwarding unit is connected to the management control unit 42 by using a management control bus.

The number of forwarding units outside the board in this embodiment may be specifically determined according to a capacity of the to-be-transmitted data, which can not only reduce costs of capacity expansion, but also simplify a software control algorithm.

Functions of the management control unit 42 in this embodiment may be specifically implemented by using a device such as a Power PC or an Inter CPU; functions of the forwarding unit may be implemented by using a device such as a layer 2 forwarding chip LSW or a layer 3 forwarding chip NP; a high-speed bus such as a PCI bus, a PCIE bus, or a Rapid IO bus, or a low-speed bus such as a UART bus, an IIC bus, or an MDIO bus may be used as the management control bus; and multiple types of service buses such as a 10G KR bus, an XAUI bus, a GE bus, and an FE bus may be used as the forwarding bus.

Persons skilled in the art can understand that specific models and types of the management control unit and the forwarding unit are not limited in the embodiment of the present invention, and any functional device satisfying the management control unit and the forwarding unit shall fall within the scope of the present invention.

In this embodiment, if a board determines, according to obtained current load ratios of forwarding units and load ratio thresholds of the forwarding units, that a current load ratio of any forwarding unit of the forwarding units is less than a preset load ratio threshold, the board determines that the forwarding unit is a unit for forwarding to-be-transmitted data. In this way, a forwarding unit for data transmission can be adjusted dynamically according to the current load ratios of the forwarding units, thereby solving a problem of low data transmission reliability because in an existing load sharing apparatus, a management control unit and a forwarding unit do not share a board and a great number of boards are needed, and further improving the reliability of data transmission. In addition, in this embodiment, another forwarding unit outside the board can be used to share load with a forwarding unit built in the board, which reduces complexity of software scheduling and reduces costs.

Figure 5:
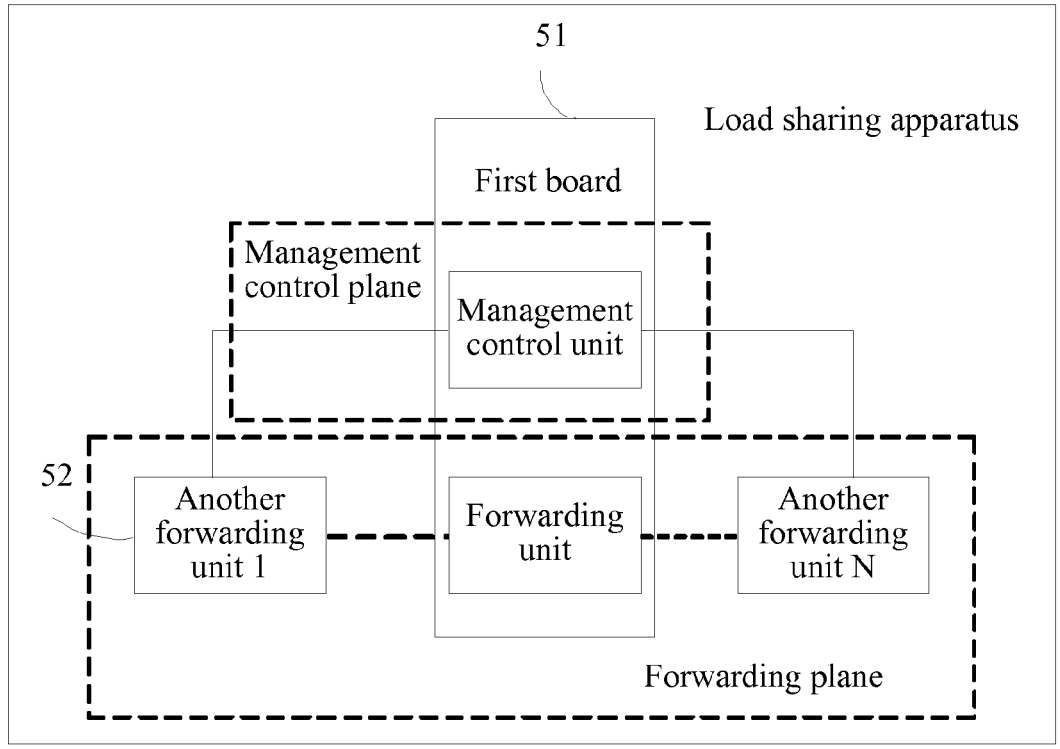
FIG. 5 is a schematic structural diagram of a load sharing apparatus according to Embodiment 3 of the present invention.

FIG. 5 is a schematic structural diagram of a load sharing apparatus according to Embodiment 3 of the present invention. As shown in FIG. 5, the apparatus specifically includes a first board 51 and another forwarding unit 52, where the another forwarding unit 52 is outside the first board 51, and the another forwarding unit 52 is connected to the first board 51.

A connection relationship between the another forwarding unit 52 and the first board 51 is specifically that the another forwarding unit 52 is connected, by using a forwarding bus, to a forwarding unit built in the first board 51, and the another forwarding unit 52 is connected, by using a management control bus, to a management control unit built in the first board 51.

The first board 51 is the board in the embodiment shown in FIG. 4.

The another forwarding unit 52 is configured to receive to-be-transmitted data that is sent by the forwarding unit built in the first board 51, and forward the to-be-transmitted data.

Figure 6:
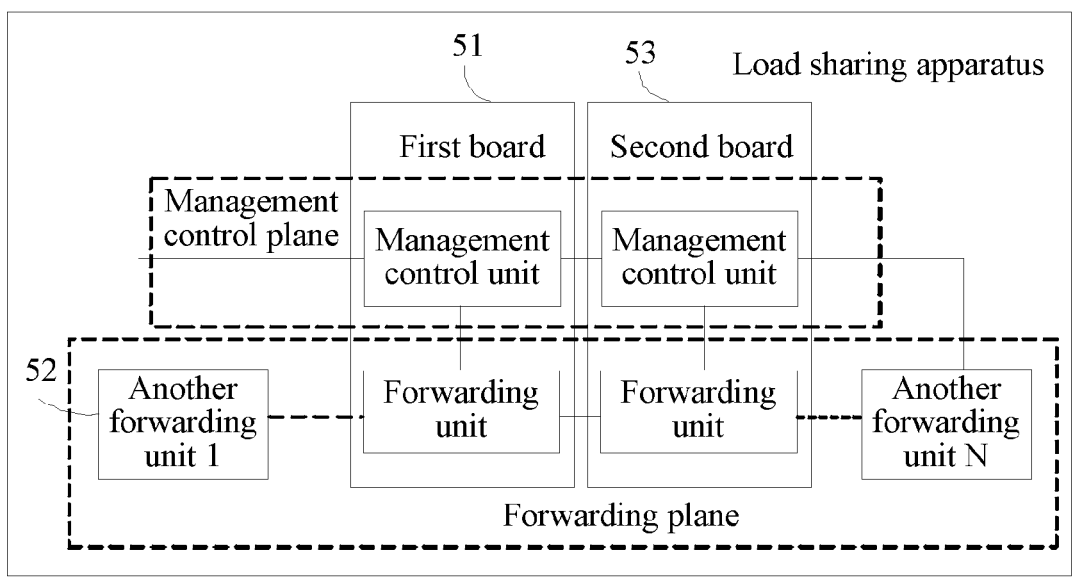
FIG. 6 is another schematic structural diagram of a load sharing apparatus according to Embodiment 3 of the present invention.

In an optional implementation manner of the embodiment of the present invention, as shown FIG. 6, the apparatus further includes a second board 53, where the second board 53 is connected to the first board 51, the second board 53 is connected to the another forwarding unit 52, and the another forwarding unit 52 is also outside the second board 52.

A connection relationship between the second board 53 and the first board 51 is specifically that a management control unit built in the second board 53 is connected, by using a management control bus, to the management control unit built in the first board 51, and a forwarding unit built in the second board 53 is connected, by using a forwarding bus, to the forwarding unit built in the first board 51.

A connection relationship between the another forwarding unit 52 and the second board 53 is specifically that the another forwarding unit 52 is connected, by using a forwarding bus, to the forwarding unit built in the second board 53, and the another forwarding unit 52 is connected, by using a management control bus, to the management control unit built in the second board 53.

In an optional implementation manner of the embodiment of the present invention, the second board 53 is the board in the embodiment shown in FIG. 4, that is, configured to share load with the first board 51 when the first board 51 works normally, which is specifically implemented as follows:

When the first board 51 work normally, the forwarding unit built in the first board receives to-be-transmitted data, and the management control unit built in the first board obtains current load ratios of the forwarding unit built in the first board and the another forwarding unit, and if it is determined that a current load ratio of any forwarding unit of the forwarding unit built in the first board and the another forwarding unit is less than a preset load ratio threshold, determines that the forwarding unit is a unit for forwarding the to-be-transmitted data;

the second board 53 is configured to share load with the first board when the first board works normally, that is, the forwarding unit built in the second board receives to-be-transmitted data, and the management control unit built in the second board obtains current load ratios of the forwarding unit built in the second board and the another forwarding unite, and if it is determined that a current load ratio of any forwarding unit of the forwarding unit built in the second board and the another forwarding unit is less than the preset load ratio threshold, determines that the forwarding unit is a unit for forwarding the to-be-transmitted data; and the another forwarding unit 52 is configured to receive the to-be-transmitted data sent by the forwarding unit built in the first board and the forwarding unit built in the second board, and forward the to-be-transmitted data.

In the embodiment of the present invention, if a load sharing apparatus determines, according to current load ratios of forwarding units and load ratio thresholds of the forwarding units, that a current load ratio of any forwarding unit of the forwarding units is less than a preset load ratio threshold, the load sharing apparatus can determine that the forwarding unit is a unit for forwarding to-be-transmitted data. In this way, a forwarding unit for data transmission can be adjusted dynamically according to the current load ratios of the forwarding units, thereby solving a problem of low data transmission reliability because in an existing load sharing apparatus, a management control unit and a forwarding unit do not share a board and a great number of boards are needed, and further improving the reliability of data transmission.

In addition, in this embodiment, another forwarding unit outside the board can be used to share load with a forwarding unit built in the board, which reduces complexity of software scheduling and reduces costs.

In addition, the load sharing apparatus in this embodiment uses two boards, and when the two boards both work normally, the two boards can work together and undertake data forwarding together. Therefore, there is no idle resource, and utilization of system resources is improved.

Figure 7:
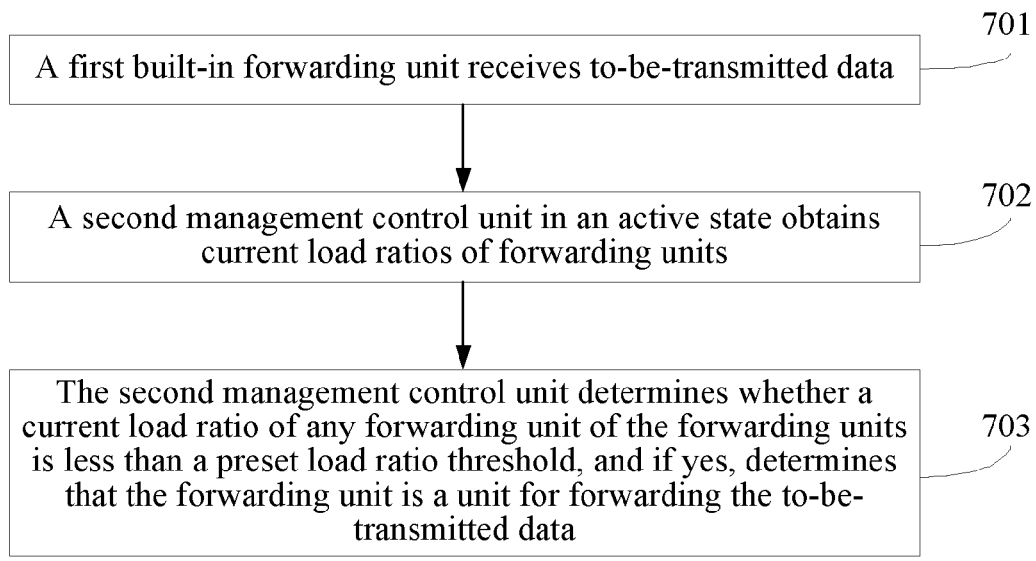
FIG. 7 is a schematic flowchart of a load sharing method according to Embodiment 4 of the present invention.

FIG. 7 is a schematic flowchart of a load sharing method according to Embodiment 4 of the present invention. As shown in FIG. 7, the method specifically includes:

Step 701: A first built-in forwarding unit receives to-be-transmitted data.

In an optional implementation manner of the embodiment of the present invention, the first built-in forwarding unit built in a standby board receives the to-be-transmitted data, and a first management control unit built in the standby board is in a standby state.

Step 702: A second management control unit in an active state obtains current load ratios of forwarding units.

In an optional implementation manner of the embodiment of the present invention, the second management control unit built in an active board is in the active state, and the second management control unit may obtain the current load ratios of the forwarding units. In specific implementation, reference may be made to related description in the embodiment shown in FIG. 3, and details are not described herein again.

In an optional implementation manner of the embodiment of the present invention, when a fault occurs on the second management control unit in the active state, the first management control unit in the standby state may switch to an active state, to obtain current load ratios of the forwarding units.

Step 703: The second management control unit determines whether a current load ratio of any forwarding unit of the forwarding units is less than a preset load ratio threshold, and if yes, determines that the forwarding unit is a unit for forwarding the to-be-transmitted data.

In specific implementation, reference may be made to related description in the embodiment shown in FIG. 3, and details are not described herein again.

In an optional implementation manner of the embodiment of the present invention, when a fault occurs on the second management control unit in the active state, the first management control unit in the standby state may determine whether a current load ratio of any forwarding unit of the forwarding units is less than the preset load ratio threshold, and if yes, determines that the forwarding unit is a unit for forwarding the to-be-transmitted data.

It should be noted that the first built-in forwarding unit and the first management control unit in the standby state are located in the standby board, the second management control unit in the active state and at least one second built-in forwarding unit are located in the active board, and the forwarding units include the first built-in forwarding unit, the second built-in forwarding unit, and another forwarding unit located in a board other than the standby board and the active board.

In the embodiment of the present invention, if it is determined, according to current load ratios of forwarding units and load ratio thresholds of the forwarding units, that a current load ratio of any forwarding unit of the forwarding units is less than a preset load ratio threshold, it can be determined that the forwarding unit is a unit for forwarding to-be-transmitted data. In this way, a forwarding unit for data transmission can be adjusted dynamically according to the current load ratios of the forwarding units, thereby solving a problem of low data transmission reliability because in an existing load sharing apparatus, a management control unit and a forwarding unit do not share a board and a great number of boards are needed, and further improving the reliability of data transmission. In addition, in this embodiment, another forwarding unit outside the board can be used to share load with a forwarding unit built in the board, which reduces complexity of software scheduling and reduces costs.

In addition, when a fault occurs on an active management control unit in this embodiment, a standby management control unit can undertake the task of managing and controlling the forwarding units, thereby ensuring reliability of data transmission.

Figure 8:
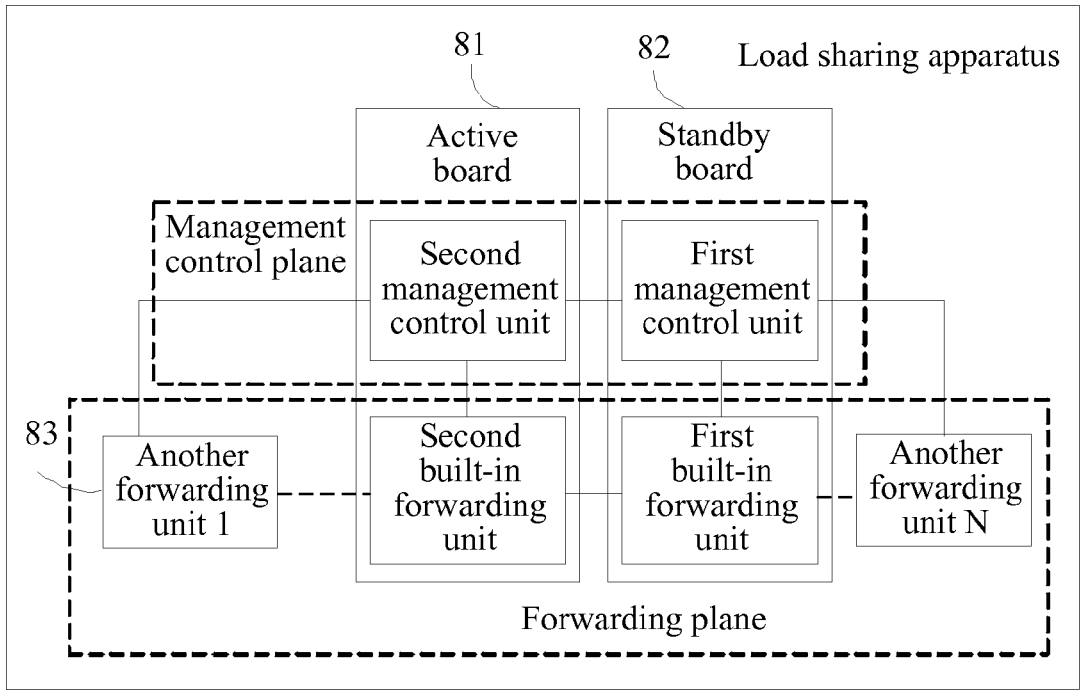
FIG. 8 is a schematic structural diagram of a load sharing apparatus according to Embodiment 5 of the present invention.

FIG. 8 is a schematic structural diagram of a load sharing apparatus according to Embodiment 5 of the present invention, which specifically includes: an active board 81, a standby board 82, and another forwarding unit 83 outside the active board 81 and the standby board 82, where the another forwarding unit 83 is separately connected to the active board 81 and the standby board 82, and the active board 81 is connected to the standby board 82.

In an optional implementation manner of the embodiment of the present invention, a first built-in forwarding unit in the standby board 82 is configured to receive to-be-transmitted data, and a first management control unit in the standby board 82 is in a standby state;

a second management control unit in the active board 81 is in an active state, and is configured to obtain current load ratios of forwarding units, and if it is determined that a current load ratio of any forwarding unit of the forwarding units is less than a preset load ratio threshold, determine that the forwarding unit is a unit for forwarding the to-be-transmitted data; and the another forwarding unit 83 is configured to receive the to-be-transmitted data sent by the first built-in forwarding unit, and forward the to-be-transmitted data.

In an optional implementation manner of the embodiment of the present invention, the standby board 82 is further configured to serve as an active board when a fault occurs on the active board 81, that is, the first management control unit in the standby state obtains current load ratios of the forwarding units; and the first management control unit determines whether a current load ratio of any forwarding unit of the forwarding units is less than the preset load ratio threshold, and if yes, determines that the forwarding unit is a unit for forwarding the to-be-transmitted data.

It should be noted that the management control units in the active board and the standby board may be located on, for example, a management control plane, the forwarding units in the active board and the standby board, and the another forwarding unit may be located on, for example, a forwarding plane.

It should be noted that, in order to reduce complexity of software configuration and networking configuration, the load sharing apparatus in this embodiment includes at most two boards, and the number of forwarding units outside the board may be specifically determined according to a capacity of the to-be-transmitted data.

In the embodiment of the present invention, if a load sharing apparatus determines, according to current load ratios of forwarding units and load ratio thresholds of the forwarding units, that a current load ratio of any forwarding unit of the forwarding units is less than a preset load ratio threshold, the load sharing apparatus can determine that the forwarding unit is a unit for forwarding to-be-transmitted data. In this way, a forwarding unit for data transmission can be adjusted dynamically according to the current load ratios of the forwarding units, thereby solving a problem of low data transmission reliability because in an existing load sharing apparatus, a management control unit and a forwarding unit do not share a board and a great number of boards are needed, and further improving the reliability of data transmission. In addition, in this embodiment, another forwarding unit outside the board can be used to share load with a forwarding unit built in the board, which reduces complexity of software scheduling and reduces costs.

In addition, the load sharing apparatus in this embodiment uses two boards, and when a fault occurs on one board, the other board can undertake forwarding of data that passes through the two boards, thereby ensuring reliability of data transmission.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A load sharing method, comprising:
presetting, by a management controller, load ratio thresholds of forwarding units according to maximum transmission capacities of the forwarding units;
receiving, by a built-in forwarding unit, to-be-transmitted data;
obtaining, by the management controller, current load ratios of the forwarding units; and
determining whether a current load ratio of any forwarding unit of the forwarding units is less than a preset load ratio threshold, and if yes, determining that the forwarding unit is a unit for forwarding the to-be-transmitted data, wherein
the built-in forwarding unit and the management controller are located in a first circuit board, and the forwarding units comprise the built-in forwarding unit and another forwarding unit outside the first circuit board.

2. The method according to claim 1, before the receiving, by a built-in forwarding unit, to-be-transmitted data, further comprising:
  receiving, by the management controller, the current load ratios sent by the forwarding units in real time, and updating, according to the current load ratios sent by the forwarding units in real time, the current load ratios corresponding to the forwarding units in a load information list in real time.

3. The method according to claim 2, wherein the obtaining, by a management controller, current load ratios of forwarding units comprises:
  querying the load information list, to obtain the current load ratios of the forwarding units.

4. The method according to claim 1, after the receiving, by a built-in forwarding unit, to-be-transmitted data and before the obtaining, by a management controller, current load ratios of forwarding units, comprising:
  separately sending, by the management controller, request messages for querying for the current load ratios of the forwarding units to corresponding forwarding units, so that the forwarding units obtain respective corresponding current load ratios; and
  separately receiving response messages sent by the forwarding units, wherein the response messages comprise the current load ratios corresponding to the forwarding units.

5. A circuit board, comprising a built-in forwarding unit and a management controller that are built in the circuit board, wherein the built-in forwarding unit is configured to receive to-be-transmitted data, and the management controller comprises:
  a memory; and
  a processor coupled to the memory and configured to:
  preset, by the management controller, load ratio thresholds of forwarding units according to maximum transmission capacities of the forwarding units;
  obtain current load ratios of the forwarding units, wherein the forwarding units comprise the built-in forwarding unit and another forwarding unit outside the circuit board; and
  if it is determined that a current load ratio of any forwarding unit of the forwarding units is less than a preset load ratio threshold, determine that the forwarding unit is a unit for forwarding the to-be-transmitted data.

6. The circuit board according to claim 5, wherein the processor is further configured to receive the current load ratios sent by the forwarding units in real time, and update, according to the current load ratios sent by the forwarding units in real time, the current load ratios corresponding to the forwarding units in a load information list in real time.

7. The circuit board according to claim 6, wherein the processor is further configured to query the load information list set by the second setting module, to obtain the current load ratios of the forwarding units.

8. The circuit board according to claim 5, wherein the processor is further configured to:
  separately send request messages for querying for the current load ratios of the forwarding units to corresponding forwarding units, so that the forwarding units obtain respective corresponding current load ratios; and separately receive response messages sent by the forwarding units, wherein the response messages comprise the current load ratios corresponding to the forwarding units; and
  send the current load ratios of the forwarding units to the obtaining module.

9. A load sharing apparatus, comprising: a first circuit board and another forwarding unit outside the first circuit board, wherein the another forwarding unit is connected to the first circuit board;
  the first circuit board is the circuit board according to claim 5; and
  the another forwarding unit is configured to receive to-be-transmitted data that is sent by a built-in forwarding unit built in the first circuit board, and forward the to-be-transmitted data.

10. The apparatus according to claim 9, wherein the apparatus further comprises a second circuit board, the second circuit board is connected to the first circuit board, the second circuit board is connected to the another forwarding unit, and the another forwarding unit is outside the second circuit board; and
  the second circuit board comprising a built-in forwarding unit and a management controller that are built in the first circuit board, wherein the built-in forwarding unit is configured to receive to-be-transmitted data, and the management controller comprises:
  a second memory; and
  a second processor coupled to the memory and configured to:
  obtain current load ratios of forwarding units, wherein the forwarding units comprise the built-in forwarding unit and another forwarding unit outside the first circuit board; and
  if it is determined that a current load ratio of any forwarding unit of the forwarding units is less than a preset load ratio threshold, determine that the forwarding unit is a unit for forwarding the to-be-transmitted data.

11. A load sharing method, comprising:
  presetting, by a second management controller, load ratio thresholds of forwarding units according to maximum transmission capacities of the forwarding units;
  receiving, by a first built-in forwarding unit, to-be-transmitted data;
  obtaining, by the second management controller in an active state, current load ratios of forwarding units; and
  determining, by the second management controller, whether a current load ratio of any forwarding unit of the forwarding units is less than a preset load ratio threshold, and if yes, determining that the forwarding unit is a unit for forwarding the to-be-transmitted data, wherein
  the first built-in forwarding unit and a first management controller in a standby state are located in a standby board, and the second management controller in the active state and at least one second built-in forwarding unit are located in an active board; and the forwarding units comprise the first and the second built-in forwarding units and another forwarding unit located in a first circuit board other than the standby board and the active board.

12. The method according to claim 11, wherein when a fault occurs on the second management controller in the active state, the method further comprises:
  switching, by the first management controller, to an active state, to obtain current load ratios of the forwarding units; and
  determining, by the first management controller, whether a current load ratio of any forwarding unit of the forwarding units is less than the preset load ratio threshold, and if yes, determining that the forwarding unit is a unit for forwarding the to-be-transmitted data.

13. A load sharing apparatus, comprising a standby board, an active board, and another forwarding unit outside the standby board and the active board, wherein the another forwarding unit is separately connected to the standby board and the active board, and the active board is connected to the standby board;
  a memory; and
  a processor coupled to the memory and configured to:
    preset, by a first management controller, load ratio thresholds of forwarding units according to maximum transmission capacities of the forwarding units;
    a first built-in forwarding unit in the standby board is configured to receive to-be-transmitted data, and the first management controller in the standby board is in a standby state;
    a second management controller in the active board is in an active state, and is configured to obtain current load ratios of forwarding units, and if it is determined that a current load ratio of any forwarding unit of the forwarding units is less than a preset load ratio threshold, determine that the forwarding unit is a unit for forwarding the to-be-transmitted data; and
    the another forwarding unit is configured to receive the to-be-transmitted data sent by the first built-in forwarding unit, and forward the to-be-transmitted data.

14. The load sharing apparatus according to claim 13, wherein the standby board is further configured to serve as an active board when a fault occurs on the active board, wherein the first management controller is configured to obtain current load ratios of the forwarding units; and the first management controller determines whether a current load ratio of any forwarding unit of the forwarding units is less than the preset load ratio threshold, and if yes, determines that the forwarding unit is a unit for forwarding the to-be-transmitted data.

* * * * *